(12) United States Patent
Tütek (10) Patent No.: US 11,940,055 B2
(45) Date of Patent: Mar. 26, 2024

(54) PRV-PRESSURE RELIEF VALVE

(71) Applicant: SERDAR PLASTİK SANAYİ VE TİCARET ANONİM ŞİRKETİ, Ankara (TR)

(72) Inventor: Mustafa Serdar Tütek, Ankara (TR)

(73) Assignee: SERDAR PLASTİK SANAYI VE TICARET ANONIM, Ankara (TR)

( * ) Notice: Subject to any disclaimer, the term of this patent is extended or adjusted under 35 U.S.C. 154(b) by 0 days.

(21) Appl. No.: 17/639,341

(22) PCT Filed: Sep. 1, 2020

(86) PCT No.: PCT/TR2020/050791
§ 371 (c)(1),
(2) Date: Mar. 1, 2022

(87) PCT Pub. No.: WO2021/040668
PCT Pub. Date: Mar. 4, 2021

(65) Prior Publication Data
US 2022/0325811 A1 Oct. 13, 2022

(51) Int. Cl.
*F16K 17/06* (2006.01)
*F16K 27/02* (2006.01)

(52) U.S. Cl.
CPC .......... *F16K 17/06* (2013.01); *F16K 27/0209* (2013.01); *Y10T 137/7929* (2015.04)

(58) Field of Classification Search
CPC ...... F16K 17/04; F16K 17/0413; F16K 17/06; F16K 17/168; Y10T 137/7876; Y10T 137/7877; Y10T 137/7929; Y10T 137/7932; F16L 37/098
See application file for complete search history.

(56) References Cited

U.S. PATENT DOCUMENTS

| | | | | |
|---|---|---|---|---|
| 3,837,690 A | * | 9/1974 | Fraser, Jr. ............ | G11B 23/107 279/49 |
| 4,009,845 A | * | 3/1977 | Santucci ................ | B65H 57/12 242/129.7 |
| 4,103,704 A | * | 8/1978 | Richards ................ | F16K 17/06 137/522 |
| 4,406,302 A | * | 9/1983 | Olesen ................ | A61M 16/206 137/540 |
| 4,530,373 A | * | 7/1985 | Bork, Jr. ................ | F16K 17/04 137/538 |
| 4,790,348 A | * | 12/1988 | Gausman ................ | F16K 17/04 251/86 |
| 5,551,475 A | * | 9/1996 | Nelson .................... | F16K 17/06 251/284 |

(Continued)

*Primary Examiner* — Robert K Arundale (57) ABSTRACT

In general terms, the present invention relates to a safety valve or a pressure relief valve (PRV) that is developed to be used in combination boilers and similar appliances and utilized for the purpose of controlling or limiting system pressure. Relief valves are generally used as safety devices in systems where fluid pressure is important, and they reduce the system pressure either by discharging fluid from the system or simply by interrupting the fluid conveyance in case of an emergency when there is an increase in pressure. The present invention relates to a pressure relief valve, the rear cover of which is attached to the body by means of a clawed structure and manufactured from entirely recyclable thermoplastic material.

2 Claims, 8 Drawing Sheets

(56) References Cited

U.S. PATENT DOCUMENTS

| | | | | |
|---|---|---|---|---|
| 5,771,924 A | * | 6/1998 | Huygen | F16K 17/168 |
| | | | | 251/335.2 |
| 2008/0157520 A1 | * | 7/2008 | Ryhman | F16L 37/0987 |
| | | | | 285/322 |
| 2021/0239248 A1 | * | 8/2021 | Watson | F16L 37/0915 |

* cited by examiner

PRV-PRESSURE RELIEF VALVE

The present invention relates to a type of relief valve or a pressure relief valve (PRV) that is developed to be used in combination boilers and similar appliances and utilized for the purpose of controlling or limiting system pressure. A valve is an inlet or outlet element that is opened or closed conditionally in installations carrying fluids. Such valves are generally used as safety devices in systems where fluid pressure is important, and they reduce the system pressure either by discharging fluid from the system or simply by interrupting the fluid conveyance in case of an emergency when there is an increase in pressure. Otherwise, the system pressure may accumulate over time, and an appliance or equipment failure may occur, or there may even be a fire outbreak.

TECHNICAL FIELD OF INVENTION

In general terms, the present invention relates to a type of safety valve or a pressure relief valve (PRV) that is developed to be used in combination boilers and similar appliances and utilized for the purpose controlling or limiting system pressure.

STATE OF THE ART

A pressure relief valve discharges a certain amount of steam, gas, or fluid from the system in case the system pressure rises above the valve's set pressure. Thus, such valves protect the pressure system desired to be kept safe against the potential and unauthorized increases in system pressure. A safety valve reaches its full discharge capacity with a maximum pressure increase of 10% of the set pressure. The Shut-off pressure of the safety valve is a maximum of 10% of initial opening pressure (set pressure) for compressible materials and less than 20% for incompressible substances.

Conventional valves in the state of the art require a set of adjustments in order to open the valve with a proper pressure after the spring is installed during the assembly stage. Therefore, such valves necessitate an additional adjustment piece.

DESCRIPTION OF THE INVENTION

In general, the present invention relates to a type of safety valve or a pressure relief valve (PRV) that is developed to be used in combination boilers and similar appliances and utilized for the purpose of controlling or limiting system pressure. Relief valves are generally used as safety devices in systems where fluid pressure is important, and they reduce the system pressure either by discharging fluid from the system or simply by interrupting the fluid conveyance in case of an emergency when there is an increase in pressure. The present invention relates to a pressure relief valve, the rear cover of which is attached to the body by means of a clawed structure and manufactured from entirely recyclable thermoplastic material.

The rear cover of the inventive pressure relief valve has a spiked or clawed structure by means of which further screwing processes are rendered redundant in the assembly phase thereof to the body. The inventive pressure relief valve is characterized by being assembled without using a washer on the membrane since the rear cover of the inventive pressure relief valve comprises clawed tie pieces instead of screws.

Conventional valves used in the state of the art require a set of adjustments in order to open the valve with a proper pressure after the spring is installed during the assembly stage. Therefore, such valves necessitate an additional adjustment piece. The inventive pressure relief valve is characterized by comprising springs that are individually measured prior to being assembled, thereby rendering them mountable without making any further adjustments if they are within a specific value range since they are adjusted prior to assembly, and hence rendering them ready for use. The inventive pressure relief valve allows for being opened at a specific pressure value when applicable, subsequent to respective controls and measurements

REFERENCE NUMERALS

1—Hand Wheel
2—Cover
3—Spring
4—Membrane Retainer
5—Membrane
6—Body
7—O-ring

DETAILED DESCRIPTION OF THE INVENTION

In general terms, the present invention relates to a type of safety valve or a pressure relief valve (PRV) that is developed to be used in combination boilers and similar appliances and utilized for the purpose controlling or limiting system pressure. Such valves are generally used as safety devices in systems where fluid pressure is important, and they reduce the system pressure either by discharging fluid from the system or simply by interrupting the fluid conveyance in case of an emergency when there is an increase in pressure.

In general, a round or an elliptical hole and a conical plug are formed in a disk shape, also called a valve body, at the end of a shaft. The present invention is a pressure relief valve that comprises a rear cover (2) attached to the body (6) by means of a claw structure, and that is entirely manufactured from a recyclable thermoplastic material. The inventive pressure relief valve consists of a spring (3), a body (6), and a discharge hand wheel (1). The system pressure affects the surface area and creates a force in the opening direction of the valve. The system comprises a spring (3) located at the rear side of the valve in order to balance out said force. Conventional pressure relief valves do not comprise any indicators thereon, therefore a pressure gauge that shows the pressure of the line is necessary in order to adjust the valve to the desired pressure level. In the process stage of the inventive pressure relief valve, the spring (3) is automatically measured via precise measuring, thereby eliminating the need for any adjustment pieces in the end product as well as the necessity for readjusting at the end of the line and any further adjustment due to decalibration.

A membrane (5) used in the inventive pressure relief valve serves as an O-ring (7) and provides static tightness. The membrane (5) of the inventive pressure valve has a soft structure and provides 100% sealing by blocking the passage of water just like O-rings (7). When the valve is shut, the membrane (5) remains between the body (6) and a membrane retainer (4) and sticks to the body by means of its soft structure, thereby blocking the passage of water.

When the valve is open, water may advance towards the outlet. The membrane (5) prevents any potential leakages thanks to its shape and the membrane (5) functions as a secondary O-ring.

The clawed structure of the cover (2) of the inventive pressure relief valve eliminates the need for any screwing processes during its assembly to the body (5). The inventive pressure relief valve is characterized by being mounted without using a washer on the membrane (5) as the rear cover (2) utilizes claws instead of screws.

Figure 1:
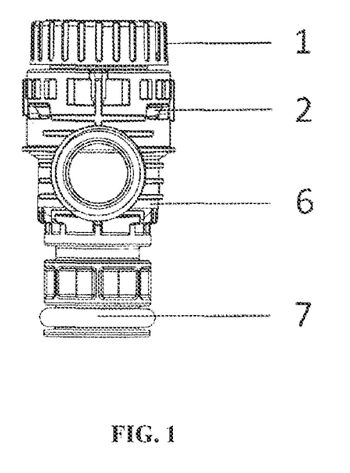
FIG. 1 illustrates the front view of the inventive PRV.
Figure 2:
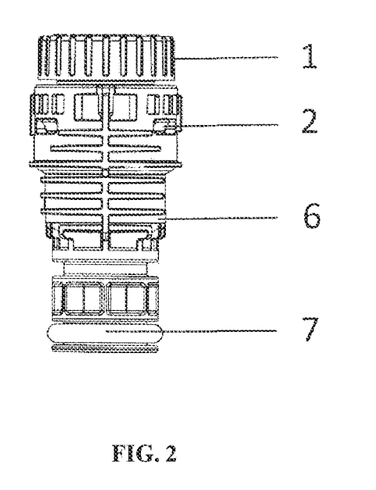
FIG. 2 illustrates the rear view of the inventive PRV.
Figure 3:
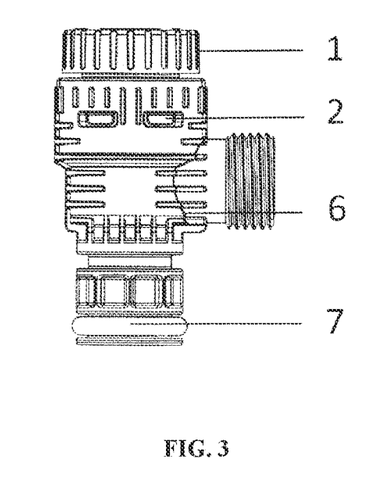
FIG. 3 illustrates the inventive PRV from the right side.
Figure 4:
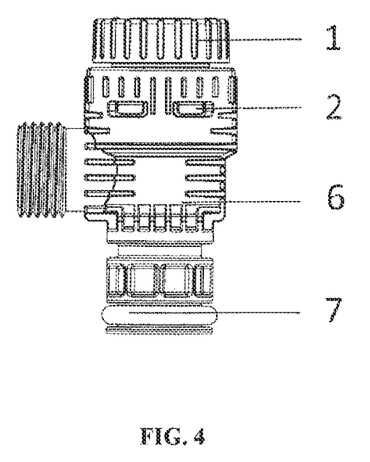
FIG. 4 illustrates the inventive PRV from the left side.
Figure 5:
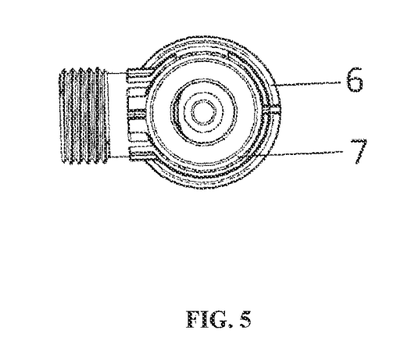
FIG. 5 illustrates the bottom view of the inventive PRV.
Figure 6:
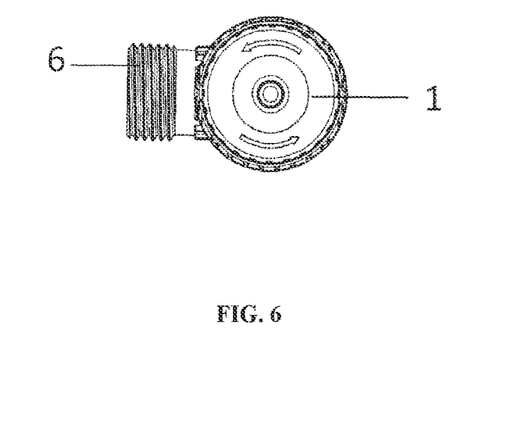
FIG. 6 illustrates the top view of the inventive PRV.
Figure 7:
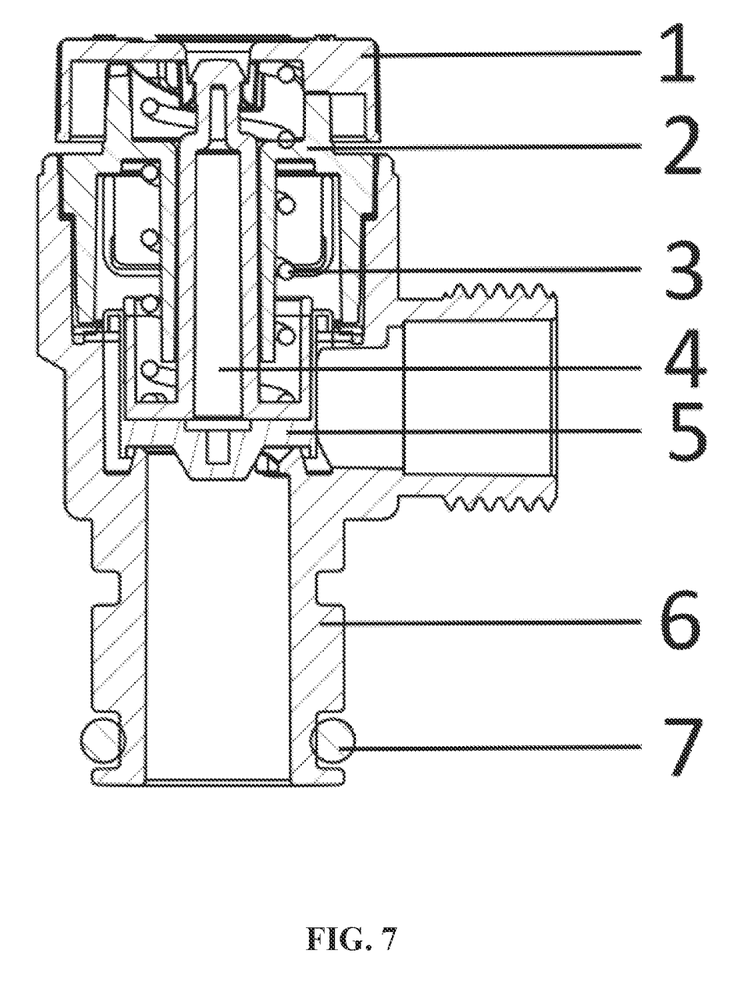
FIG. 7 illustrates the sectional view of the inventive PRV.
Figure 8:
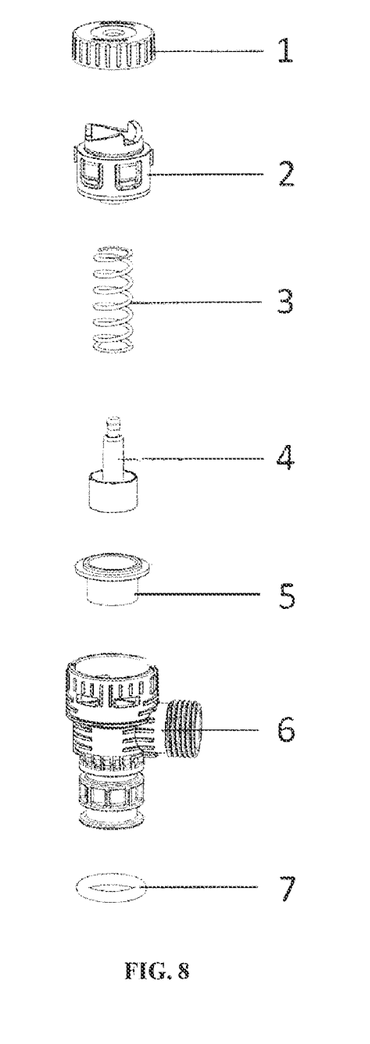
FIG. 8 illustrates the exploded view of the inventive PRV.

Components of the inventive pressure relief valve may be observed in the sectional view (FIG. 7) illustrated in FIG. 7. Accordingly, the inventive pressure relief valve comprises of; a hand wheel (1) main purpose of which is to maintain the rotational movement in rotating mechanisms; a cover (2) that enables assembly without any bolts or screws by means of the clawed structure thereof and that retains other components within the body, a spring (3) that is located at the rear side of the valve and that is used for balancing out the force created by the system pressure on the surface area of the valve in the opening direction of the valve, a membrane retainer (4) that retains the tightness element that moves on the same axis with the end thereof that is inserted into the spring, a membrane (5) that provides tightness in order to prevent the water from leaking inwards or outwards, a body (6) that houses the components constituting the inventive pressure relief valve and an O-ring (7) that comprises a piece with a soft structure that completely adheres to surfaces ensuring tightness in the area where the pressure relief valve is mounted. The inventive pressure relief valve is characterized by the fact that all constituents thereof are manufactured from recyclable thermoplastic material and that it comprises a clawed structure.

What is claimed is:

1. A pressure relief valve comprising:
    a hand wheel, a cover, a spring, a membrane retainer, a membrane, a body, and an O-ring, wherein;
    the body comprises of plurality of horizontal slots spaced apart from each other and disposed radially towards upper portion of the body;
    the cover is provided with plurality of clawed structures, spaced apart from each other, disposed radially on the cover, wherein:
        each of the clawed structures comprises a first side, a second side, a third side and a fourth side;
        each of the clawed structures are connected to the cover towards the first side;
        the second side, the third side and the fourth side of each of the clawed structures remain disconnected from the cover, thereby defining a space between the cover and the second side, the third side and the fourth side of each of the clawed structures; and
        at least a portion of each of the clawed structures, towards the second side, comprises of a horizontal protrusion that protrudes away from center of the cover;
    the membrane retainer comprises of a base structure and a longitudinal member;
    the longitudinal member extends from the base structure and is disposed co-axially to the base structure;
    the base structure comprises of a side wall extending along a central axis of the membrane retainer;
    a gap is defined between the side wall of the base structure and the longitudinal member, wherein the gap is configured to receive at least a portion of the spring;
    the longitudinal member, towards a side opposite to the base structure, is provided with a first snap fit mechanism;
    the membrane retainer is configured to be received by the membrane, wherein the membrane is in turn configured to be received by the body;
    the cover comprises of a through passage, wherein the through passage is configured to receive at least a portion of the longitudinal member in a manner that at least a portion of the longitudinal member interfaces with the through passage of the cover, when the pressure relief valve is assembled;
    the hand wheel is provided with a second snap fit mechanism, wherein the hand wheel is coupled to the membrane retainer via the first snap fit mechanism and the second snap fit mechanism;
    at least a portion of the cover is configured to be received within the body; and
    at least a portion of the plurality of clawed structures comprising the horizontal protrusions provided on the cover are configured to be received by the plurality of horizontal slots on the body, when the cover is received within the body thereby providing a snap fit between the cover and the body.

2. The pressure relief valve according to claim 1, wherein the plurality of horizontal slots on the body are through slots, wherein at least the portion of the plurality of clawed structures comprising the horizontal protrusions are exposed via the through horizontal slots, when the cover is received within the body.

* * * * *